Patented Sept. 26, 1950

2,523,972

UNITED STATES PATENT OFFICE 2,523,972

BEARING BUSH

John Gilbert Sharratt and Albert Gordon Sharratt, West Bromwich, England, assignors to Arthur Wilfred Dulson, Worcester, England Application November 23, 1945, Serial No. 630,455
In Great Britain February 19, 1945

2 Claims. (Cl. 308—15)

The object of the present invention is to provide an improved means for carrying a rotatable spindle and adapted to be capable of being secured in any one of a number of holes of different diameters. For example, the spindle may be a boring bar used on a lathe, and the hole may be formed in any of a range of supports required to carry one end of the spindle and having holes of different diameters. For this purpose it is already known to employ an externally tapered bush, but this device is unsatisfactory as it does not afford a sufficiently rigid connection between the bush and the support.

In the accompanying sheet of explanatory drawings.

Figure 1:
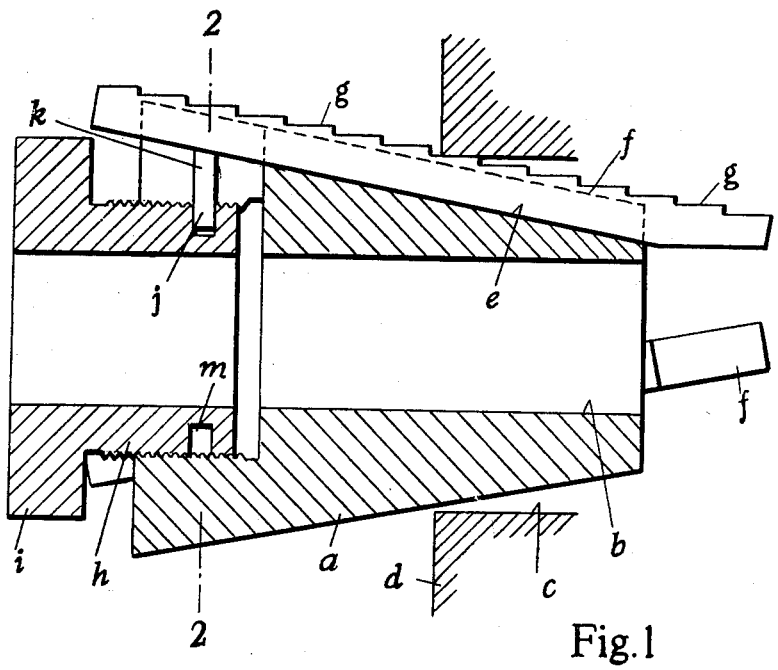
Figure 1 is a sectional side elevation of means constructed in accordance with the invention.
Figure 2:
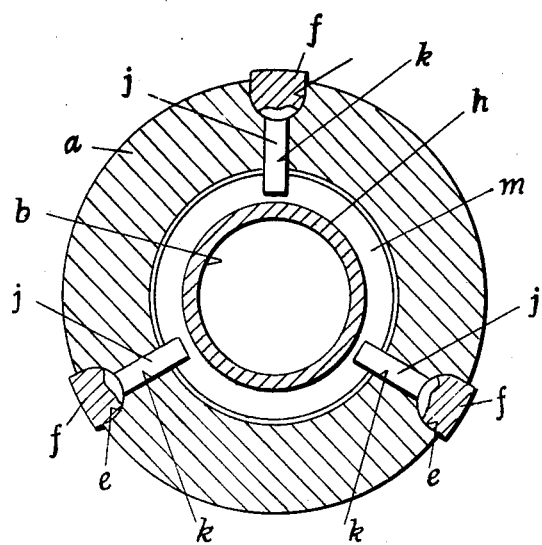
Figure 2 is a cross section on the line 2—2 of Figure 1.

In carrying the invention into effect as shown, we employ a bush $a$ having a parallel bore $b$ suited to the spindle to be carried, and having a tapered (that is to say truncated conical) outer peripheral surface, the end diameters of the bush being such as will enable it to be inserted in a hole as $c$ in a support $d$, the diameter of the hole being within the range for which the bush can be used. Along the outer surface of the bush $a$ are formed three equi-spaced and similar grooves $e$ which may conveniently be of circular cross section. In each groove $e$ is inserted a slidable bar $f$ also of circular cross section corresponding to its groove, and along the outer side of the bar are formed a series of similar flat steps $g$. These steps $g$ are such that the corresponding steps on the three bars $f$ can fit the hole as $c$ into which the bush is to be placed, that is to say they can form part of a cylindrical surface corresponding to the diameter of the hole.

For actuating the bars $f$, we enlarge one end of the bore $b$ of the bush, and form an internal screw thread thereon. In this part of the bore $b$ we insert a hollow rotatable adjusting piece $h$ which is externally screw threaded for engagement with the internal screw thread in the said part, and which at its outer projecting end is formed with a head $i$ or is otherwise adapted to be manipulated by the user. At positions near their ends which lie adjacent to the adjusting piece $h$, the bars $f$ are each provided with a laterally projecting peg $j$ which extends through a radial slot $k$ in the adjacent end of the bush $a$ into a circumferential groove $m$ in the adjusting piece. Rotation of the adjusting piece $h$ causes the bars $f$ to slide relatively to the bush $a$.

To secure the bush $a$ in position it is inserted into the hole $c$, and the adjusting piece $h$ is then rotated so as to cause the appropriate steps $g$ on the bars $f$ to enter into tight contact with the surface of the hole $c$ and thereby secure the bush $a$ in position. When so secured the bush $a$ is held firmly by the bars $f$ against risk of accidental movement, and in consequence the bush can be relied on to give adequate support to the part of the spindle inserted through it. When the bush $a$ is placed in another hole of different diameter other parts of the stepped bars $f$ come into action for securing the bush.

Whilst a bush as above described is primarily intended for supporting a boring bar, it may be applied to other analogous purposes, and subordinate constructional details may be modified if required to suit different requirements.

Having thus described our invention what we claim as new and desire to secure by Letters Patent is:

1. Means for supporting a rotatable spindle in any one of a number of holes of different diameters, comprising in combination a bush of frusto-conical form provided along its outer periphery with a plurality of grooves, bars slidable in said grooves and each formed along its outer side with a plurality of steps, and manually operable adjusting means interconnecting said bush and bars, without obstructing access to either end of the bush interior, so that actuation of said manually operable adjusting means is accompanied by simultaneous sliding movements of said bars.

2. Means for supporting a rotatable spindle in any one of a number of holes of different diameters, comprising in combination a bush of frusto-conical form provided along its outer periphery with a plurality of grooves, bars slidable in said grooves and each formed along its outer side with a plurality of steps, a hollow rotatable adjusting piece in screw thread engagement with one end of said bush, the bore of said bush being formed at the said end with an enlargement into which said adjusting piece is inserted to prevent said adjusting piece from obstructing access to said bore, and laterally projecting pegs on said bars, said pegs being arranged to extend through slots in said bush into engagement with a circumferential groove in said adjusting piece so that rotational movement of said adjusting piece is accompanied by simultaneous sliding movements of said bars.

JOHN GILBERT SHARRATT.
ALBERT GORDON SHARRATT.

REFERENCES CITED

The following references are of record in the file of this patent:

UNITED STATES PATENTS

| Number | Name | Date |
| --- | --- | --- |
| 122,920 | Simons | Jan. 23, 1872 |
| 465,075 | Grantland | Dec. 15, 1891 |
| 1,428,035 | Jarmolowsky | Sept. 5, 1922 |
| 1,568,049 | Briscoe | Jan. 5, 1926 |
| 2,397,773 | Beedle | Apr. 2, 1946 |